April 12, 1932.  J. O. BETTERTON  1,853,536
METAL REFINING
Original Filed Dec. 3, 1929
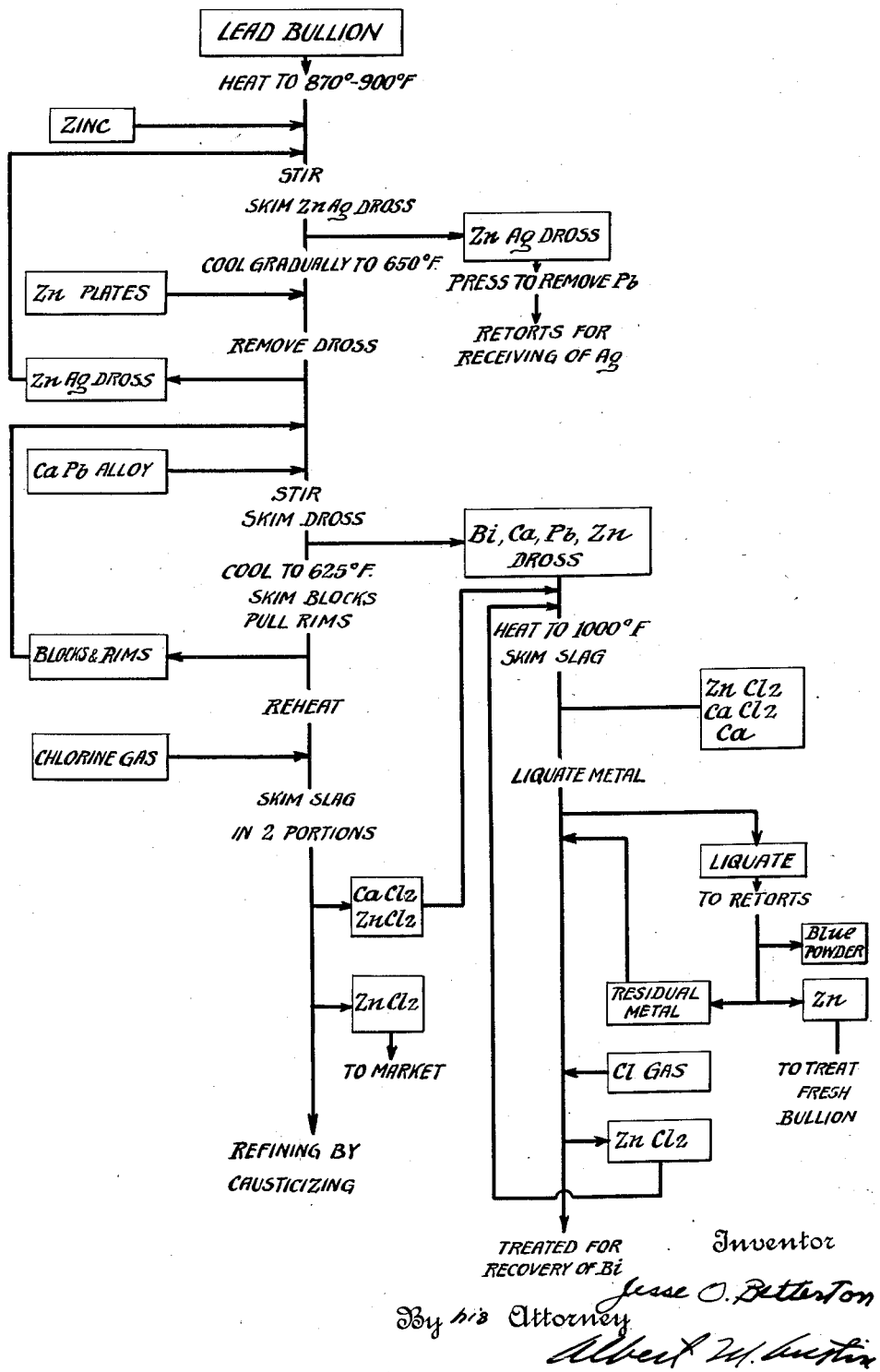
Inventor
Jesse O. Betterton
By his Attorney
Albert W. Austin Patented Apr. 12, 1932

1,853,536

UNITED STATES PATENT OFFICE

JESSE OATMAN BETTERTON, OF OMAHA, NEBRASKA, ASSIGNOR TO AMERICAN SMELTING AND REFINING COMPANY, OF NEW YORK, N. Y., A CORPORATION OF NEW JERSEY

METAL REFINING

Application filed December 3, 1929, Serial No. 411,397. Renewed September 3, 1931.

This invention relates to the refining of metals, and more particularly to the removal of silver and bismuth from lead.

In accordance with the present invention, silver and bismuth are removed by suitable reagents such as zinc and calcium respectively in continuous operation without intermediate cooling of the bath. After the metal has been suitably treated by the above reagents, the excess of said reagents is removed simultaneously by the addition of suitable amounts of chlorine which combine with the zinc and calcium to form chlorides of these elements. The invention also provides for the selective recovery of the above elements and the selective recovery of the excess reagents whereby the cost of operation is reduced to a minimum.

The invention further consists in the new and novel features of operation and the new and original arrangements and combinations of steps in the process hereinafter described and more particularly set forth in the claims.

Although the novel features which are believed to be characteristic of this invention will be particularly pointed out in the claims appended hereto, the invention itself, as to its objects and advantages, the mode of its operation and the manner of its organization may be better understood by referring to the following description in which a particular commercial embodiment thereof is disclosed. It will be understood however, that the processes and the steps thereof may be modified in various respects without departing from the broad spirit and scope of the invention.

The drawing forming a part of the present application is a flow sheet illustrating the present process.

In the following description and in the claims the various steps in the process and the details comprising the invention will be identified by specific names for convenience but they are intended to be as generic in their application as the art will permit.

The present process is carried out by heating the bath of lead to a suitable temperature, after which a quantity of zinc is added sufficient to form a silver dross which may be removed and treated for the recovery of silver therefrom. After the major portion of the silver has been removed zinc plates are added and blocks are formed as the bath is gradually cooled. These blocks contain the further quantities of silver and are used as a source of zinc for the treatment of subsequent baths.

After the desired number of blocks have been formed and the metal has been cooled to a suitable temperature, calcium is added in the form of a calcium lead alloy whereby a lead-calcium-bismuth-zinc dross is obtained which contains substantially the entire bismuth content of the bath. This is removed and suitably treated for the recovery of bismuth and zinc therefrom.

The bath is then further cooled and more blocks containing zinc-silver dross are formed. After these are removed, chlorine is applied which combines with the zinc and calcium to produce chlorides of these elements in which form they are removed from the bath. The silver and bismuth content of the bath is thus reduced to the required percentage and the metal is in condition for use in further refining which may be carried out in a manner well known in the art.

The lead-calcium-bismuth-zinc dross may be melted under a zinc chloride, calcium chloride slag to remove the calcium content therefrom. The bath may then be treated by liquation for the removal of the zinc. The liquate contains the greater portion of the zinc which may be sent to the retorts to recover the zinc value. The bath, together with the retort metal, is then treated with chlorine gas with the production of a zinc chloride slag which may be removed therefrom and added to the zinc chloride, calcium chloride slag. The bismuth remains in the bath and may be recovered in any suitable manner.

As a specific example of a manner in which this process may be carried out, a bath of lead bullion is heated to a temperature of 875° to 900° F., after which zinc and blocks from previous refining operations are added while suitably stirring the bath to produce the desired reaction. A zinc-silver dross is formed which is skimmed and may be pressed to largely remove the lead therefrom. The dross is then sent to the retorts wherein the silver may be recovered in the usual manner.

After the dross is removed the bath is allowed to gradually cool while zinc plates are added. Further quantities of dross are then formed which may be removed and cast in blocks. These blocks may be returned to subsequent baths as a source of zinc in the desilverizing step above mentioned.

In a specific instance the process was carried out until twelve blocks were formed and the bath had reached a temperature of 650° F. The bath was then maintained at this temperature and a calcium-lead alloy added and stirred into the molten metal. A bismuth dross comprising a bismuth-calcium-lead-zinc alloy was then removed and treated for the recovery of the bismuth and zinc contained therein.

Thereafter, by cooling the bath to the freezing point of lead, approximately 625° F., three blocks were formed in the manner pointed out above together with rims as the metal adjacent the sides of the container solidified. These blocks and rims were removed and used for treatment of subsequent baths. The bath was then re-heated and chlorine was then added in sufficient quantity to unite with the calcium and zinc to form slags of zinc chloride and calcium chloride. The first slags contained all of the calcium as calcium chloride with some of the zinc as zinc chloride, and may be used for treating high bismuth drosses. The final slags are free from calcium chloride and represent the normal zinc chloride salt, which may be used in any well known manner.

The lead-calcium-bismuth-zinc dross is treated for the removal of calcium and zinc and the recovery of the bismuth by melting under said first slag of calcium chloride and zinc chloride at a temperature of approximately 1000° F. The resulting slag contains the calcium content of the bath and may be removed and treated for the recovery of the metal values if desired.

After the removal of the slag the metal is liquated, the liquate portion containing the greater part of the zinc and the bath containing the greater portion of the bismuth. The liquate may be heated in retorts for the production of blue powder and metallic zinc which may be used in the desilverizing step during the treatment of further quantities of material.

The retort metal containing zinc and bismuth is added to the bath which is then treated with chlorine gas to form a zinc chloride slag. The slag contains the remainder of the zinc and may be added to the zinc chloride, calcium chloride slag with which the high bismuth dross is treated. The bath will contain the remainder of the bismuth and may be treated in any suitable manner for the recovery thereof.

In the above process the bismuth-calcium-zinc dross contains approximately 5% by weight of the bullion treated and is so processed as to allow the recovery of the zinc as metallic zinc which is in suitable condition for further use in desilverization. The quantity of zinc chloride slag which is produced in excess of that which can be used for the above described process is reduced to a minimum and the operating time is materially decreased.

Although certain novel features of the invention have been shown and described and are pointed out in the annexed claims, it will be understood that various omissions, substitutions and changes in the forms and details of the devices illustrated and in its operation may be made by those skilled in the art without departing from the spirit of the invention.

What is claimed is:

1. The process of treating lead which comprises heating a bath of lead, adding zinc to said bath, whereby a zinc-silver dross is produced, adding a calcium-lead alloy to said bath whereby a calcium-lead-bismuth-zinc dross is obtained, treating said bath with chlorine gas to remove the calcium and zinc as chlorides, treating the calcium-lead-bismuth-zinc dross to recover metallic zinc and bismuth therefrom and utilizing the metallic zinc for the treatment of further quantities of metal.

2. The process of refining lead which comprises heating said lead to form a bath, adding zinc thereto to form a zinc-silver dross, removing said dross and treating the same for the recovery of silver, adding a calcium alloy to said bath to form a bismuth dross, removing said dross, treating said bath with chlorine to form a zinc chloride, calcium chloride slag and heating said bismuth dross under said slag to remove the calcium from said dross, separating the zinc from the metal of the dross by liquation, recovering metallic zinc from the liquate, utilizing said metallic zinc for further desilverization, treating the metal with chlorine gas to remove the remainder of the zinc as a zinc chloride slag, adding said slag to the calcium chloride, zinc chloride slag for the treatment of further quantities of material and treating the metal to remove the bismuth.

3. The cyclic process of refining lead which comprises heating said lead to form a bath, adding zinc thereto to form a zinc silver dross, removing said dross and treating the same for the recovery of silver, adding a calcium alloy to said bath to form a bismuth dross, removing said dross, treating said bath with chlorine to form a zinc chloride, calcium chloride slag and heating said bismuth dross under said slag to remove the calcium from said dross, removing said slag, separating the zinc from the metal of the dross by liquation, recovering metallic zinc from the liquate and utilizing said metallic zinc for further desilverization.

4. The cyclic process of refining lead which comprises heating said lead to form a bath, adding zinc thereto to form a zinc silver dross, removing said dross and treating the same for the recovery of silver, adding a calcium lead alloy to said bath to form a bismuth dross, removing said dross, treating said bath with chlorine to form a zinc chloride, calcium chloride slag and heating said bismuth dross under said slag to remove the calcium from said dross, removing said slag, separating the zinc from the metal of the bath by liquation, recovering metallic zinc from the liquate by retorting and utilizing said metallic zinc for further desilverization.

5. The process of refining lead which comprises treating a bath of said lead with zinc for the removal of silver therefrom, then treating said bath with calcium for the removal of bismuth in a bismuth-calcium-lead-zinc dross, recovering the calcium from said dross by melting under a chloride slag, recovering a portion of the zinc from said dross by liquation, utilizing said zinc for further desilverization, recovering the remainder of the zinc from said dross by the addition of chlorine to form a zinc-chloride slag, and utilizing said slag for the treatment of further quantities of dross.

6. The process of refining lead which comprises treating a bath of lead with zinc to form a zinc silver dross, further treating said bath with calcium to form a high bismuth dross containing bismuth, calcium, zinc and lead, treating the bath with chlorine gas to remove the zinc and calcium as a chloride slag recovering the calcium from said high bismuth dross by melting under said chloride slag, liquating the metal of said dross to remove a portion of the zinc, recovering said zinc in a retort and utilizing the same for further desilverization, returning the retort metal to the liquate bath, treating said bath with chlorine to remove the remainder of the zinc as a chloride slag, utilizing said slag for the treatment of further quantities of dross and treating the bath for the recovery of bismuth therefrom.

7. The process of refining lead which comprises treating a bath of lead with zinc to form a zinc silver dross, further treating said bath with calcium to form a bismuth dross, containing bismuth, calcium zinc and lead, liquating the high bismuth dross to remove a portion of the zinc, recovering said zinc in a retort and utilizing the same for further desilverization.

8. The process of treating lead for the removal of silver and bismuth and other impurities therefrom which comprises forming a bath of said lead, adding zinc thereto to form a zinc-silver dross, adding a calcium alloy to the bath to form a dross containing bismuth, treating the bath with chlorine gas to remove the calcium and zinc as chlorides and treating the bismuth dross to recover metallic zinc and bismuth therefrom.

9. The process of refining lead containing silver and bismuth to effect a recovery of said bismuth which comprises melting said lead and forming a molten bath therefrom, incorporating a zinc-yielding material in said molten bath to remove the silver therefrom, maintaining said lead bath in a molten condition, incorporating in the presence of a zinc yielding material a calcium yielding substance in said molten bath to remove the bismuth as a zinc-calcium-bismuth dross, and then treating said dross for recovery of zinc suitable for re-use in the step of removing silver from lead bullion.

10. The process of refining lead containing silver and bismuth to effect a recovery of said bismuth which comprises melting said lead and forming a molten bath therefrom, incorporating zinc in said molten lead bath to effect a removal of silver therefrom, maintaining said lead bath in a molten condition, adding in presence of zinc a calcium alloy to said bath to remove the bismuth as a zinc-calcium-bismuth containing dross, removing said zinc-calcium-bismuth containing dross and treating the said dross for the recovery of zinc suitable for re-use in the step of removing silver from lead bullion.

11. The process of treating lead for the removal of silver and bismuth and other impurities therefrom which comprises forming a bath of said lead, adding zinc thereto to form a zinc-silver dross, adding a calcium alloy to the bath to form a dross containing bismuth, cooling said bath to approximately 625° F. whereby further quantities of zinc-silver dross are formed, reheating and treating the bath with chlorine gas to remove the calcium and zinc as chlorides and treating the bismuth dross to recover metallic zinc and bismuth therefrom.

In testimony whereof I have hereunto set my hand.

JESSE OATMAN BETTERTON.